Patented July 29, 1941

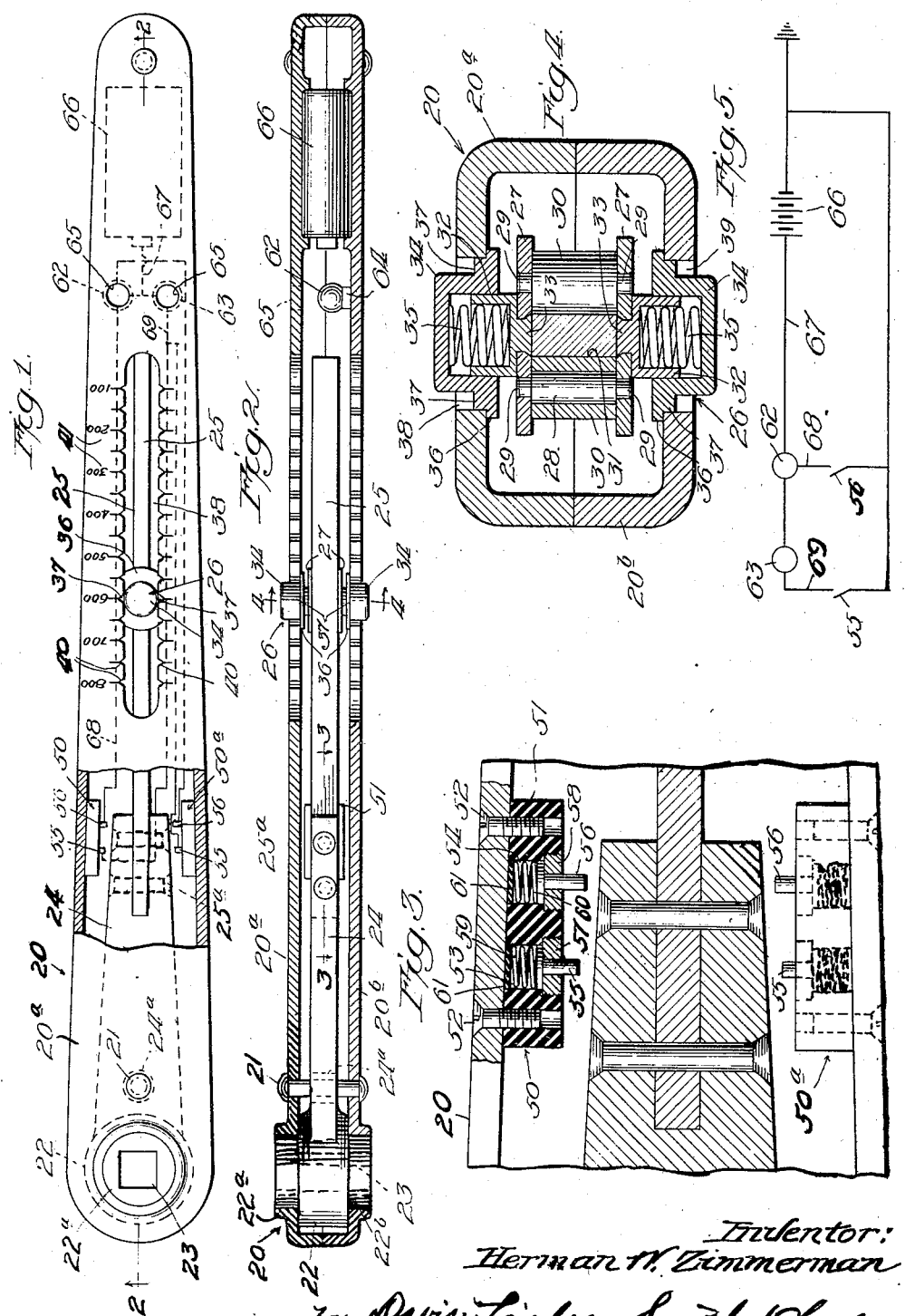

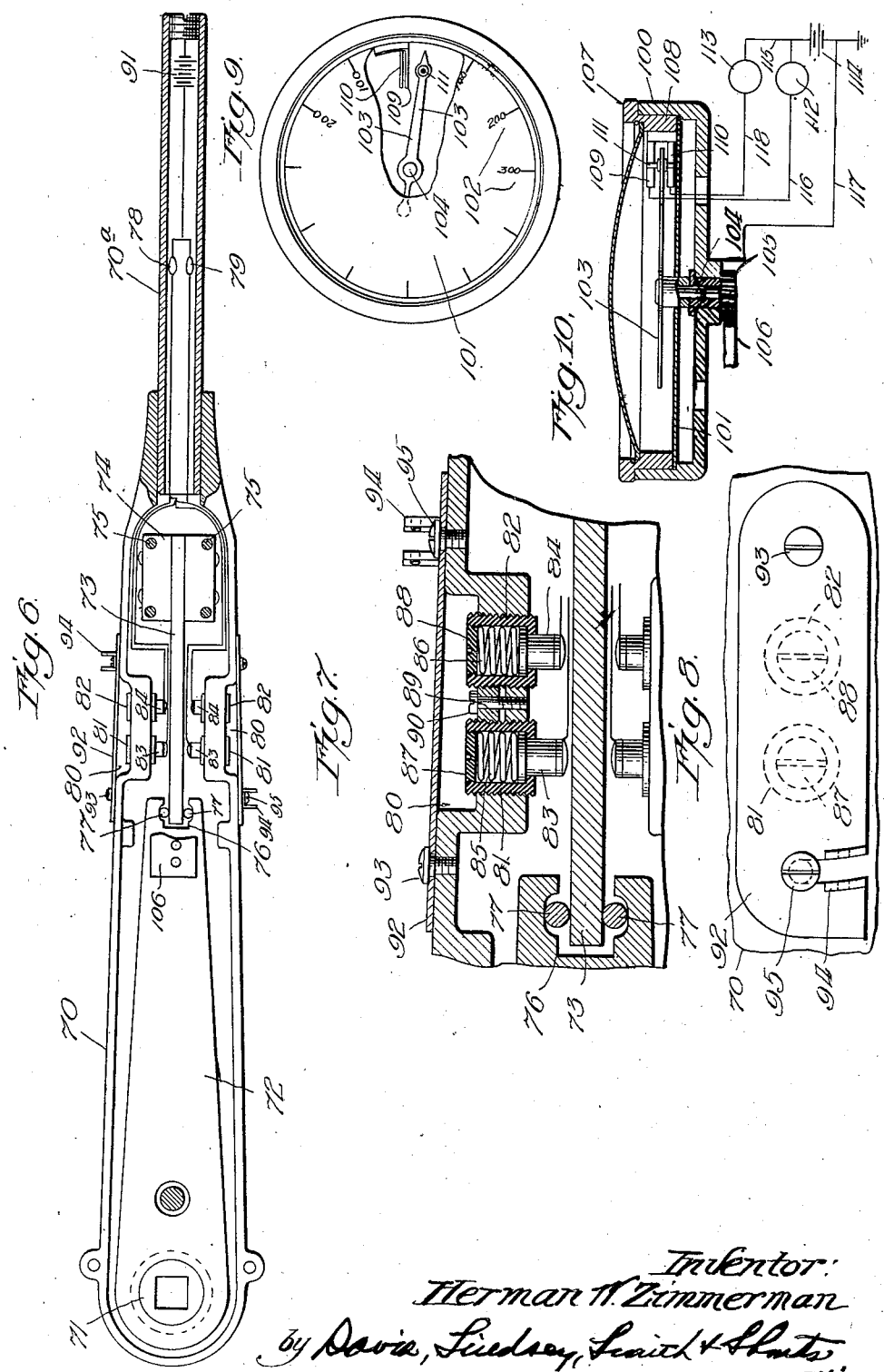

2,250,941

UNITED STATES PATENT OFFICE 2,250,941

TORQUE MEASURING WRENCH

Herman W. Zimmerman, Highland Park, Ill., assignor, by mesne assignments, to Automotive Maintenance Machinery Co., North Chicago, Ill., a corporation of Illinois Application May 21, 1938, Serial No. 209,274

28 Claims. (Cl. 177—311)

My invention relates to torque measuring wrenches, and it has to do more particularly with wrenches of the foregoing character for measuring the force or torque applied therethrough to work such as nuts, bolts, studs and the like.

One of the objects of my invention is to provide an improved torque measuring wrench which is of simple construction and which is adapted to operate in a highly efficient manner.

Another object is to provide a wrench of the foregoing character which includes novel signal means by which the user may readily determine when the work has been set up to a predetermined desired extent, the arrangement being such that the user is enabled to manipulate the wrench more rapidly and with greater accuracy, while requiring less skill and inconvenience on his part.

A further object is to provide a torque measuring wrench of a character adapted to readily indicate a predetermined pressure condition to the user notwithstanding the position that the user may assume with respect to the work, the arrangement being such that a signal is first given the user warning him that he is closely approaching the desired pressure condition and another signal is later given indicating that the predetermined pressure condition has been reached.

A still further object is to provide an adjustable torque measuring wrench adapted to indicate by a sign or signal when the work being tightened is set up to a predetermined extent and arranged for varying the amount of pressure at which the signal giving means is operable.

Still another object is to provide a torque measuring wrench of the foregoing character embodying spring means through which pressure is applied to the work and which is so constructed and arranged that the power rating of the spring means may be readily adjusted to cause signal means to indicate variable pressure conditions.

A more specific object is to provide a torque measuring wrench adapted to give a signal to the user when a predetermined pressure is applied to the work, the wrench being constructed and arranged to include an elongated spring bar member through which pressure is applied to the work and means whereby the effective moment arm of the spring may be varied in a predetermined manner to vary the pressure at which the signal will be given.

Another specific object is to provide a wrench of the foregoing character wherein the signal means includes at least two electric lamps of different colors, one of which is adapted to be lighted to give a warning signal when a predetermined pressure condition is closely approached and another to give a stop signal when the predetermined pressure condition is reached.

Other objects and advantages will become apparent as this description progresses, and by reference to the drawings wherein—

Figure 1 is a top plan view of one form of wrench embodying my invention, a portion of the casing being broken away to more clearly illustrate the relationship of certain of the parts;

Fig. 2 is a longitudinal sectional view taken substantially on the line 2—2 of Fig. 1;

Fig. 3 is an enlarged fragmental sectional view taken substantially on the line 3—3 of Fig. 2;

Fig. 4 is an enlarged sectional view taken substantially on the line 4—4 of Fig. 2;

Fig. 5 is a wiring diagram illustrating the electrical circuit arrangement employed in the structure shown in the previous figures;

Fig. 6 is another form of wrench structure embodying certain features of my invention;

Fig. 7 is an enlarged fragmental, horizontal sectional view through the electrical contact unit shown in Fig. 6;

Fig. 8 is a side elevational view of a part of the structure illustrated in Fig. 7;

Fig. 9 is a plan view of a modified form of electrical pressure indicating means that may be employed in carrying out my invention; and Fig. 10 is a sectional view taken substantially on the line 10—10 of Fig. 9 including a wiring diagram illustrating the electrical circuit employed.

The wrench shown in Figs. 1 to 5, inclusive, takes the form of an elongated hollow body 20 formed of two sections 20$^a$ and 20$^b$ secured together adjacent their ends by rivets 21 or other suitable fastening devices. The body 20 rockably supports, at its forward end, a work-engaging member 22 having on its opposite sides annular, axially-disposed reduced and aligned bearing portions 22$^a$, 22$^b$ rotatably engaged in aligned openings in the adjacent body sections 20$^a$ and 20$^b$. The member 22 is provided with a rectangular or other irregularly-shaped axial opening 23 adapted to non-rotatably receive a work adapter (not shown) of any suitable form for directly engaging the tool with the work. The mid-portion of member 22 is provided with an arm 24 (Figs. 1 and 2) extending rearwardly within the casing 20, and to the rear end of which an elongated spring bar 25 is fixedly secured by rivets 25$^a$. The spring bar 25 is operably connected to the body 20 by an adjustable connector unit 26 (Figs. 1, 2 and 4), and the arrangement is such that force is applied to the work directly through the body 20, spring 25 and member 22. The arm 24 is provided with an enlarged opening 24ª near its forward end through which the forward body rivet 21 passes. In this way, free relative rock movement of the arm 24 and body 20, to the desired extent, is permitted.

As pressure is applied to the work, there is a tendency for relative rock movement between the body 20 and the member 22, but the spring bar 25 opposes such movement until the initial tension thereof is overcome, at which time such spring bar will begin to flex. As such flexing takes place, the body 20 and member 22 will rock relatively and, by measuring the extent of such relative rock movement, one may readily determine the amount of pressure applied to the work. The particular wrench shown is of a character wherein a signal is given when a predetermined pressure is applied to the work, indicating that enough pressure has been applied. Unless otherwise provided for, the wrench would require resetting under the control of a master pressure device in order that it may be properly used for applying variable pressures to the work. However, according to one feature of my invention, I adapt the foregoing wrench for indication of various pressures by providing therein adjustable spring bar means. More particularly, the amount of deflection of the spring bar 25 determines the amount of relative rock movement of the body 20 and member 22 so that a given deflection in rock movement will take place each time a pressure signal is given. By varying the effective length or moment arm of the spring bar 25, a greater or lesser pressure will be required to flex the spring bar 25 the extent necessary to give a signal and, accordingly, to this end, my invention contemplates the use of the adjustable connector 26 (Fig. 4) or its equivalent between the spring bar 25 and the body by which the active length on effective moment arm of the spring bar may be varied.

Specifically, the connector unit 26 includes a pair of plate members 27 secured together in spaced relation by a pair of laterally-spaced posts 28 having their opposite ends 29 reduced and secured in suitable openings in the plates 27. The posts 28 support roller sleeves 30 which are so constructed and arranged as to provide therebetween an opening 31 in which the free end portion of the spring bar 25 is movably received.

The connector unit 26 is connected to the body 20 for rotative and longitudinal movement relative thereto, as follows: Each plate member 27 supports, on its outer face, an annular, axially-disposed cup member 32, each of which has an axial bottom extension 33 received and riveted in an axial opening in the respective plate members 27. A cap member 34 is rotatably and slidably mounted over each cup member 32, which cap members are urged outwardly by the spring 35 received within the cup members 32 and confined therein by the cap members 34. The cap members 34 are each provided with an enlarged inner flange 36 adapted to seat against the inner wall of the respective body sections 20ª and 20ᵇ to prevent the detachment of such cap members. The cap members 34 are further provided, immediately outward from the flanges 36, with diametrically-opposed pairs of lugs 37 which are adapted to engage the casing sections 20ª and 20ᵇ and normally hold the cap members 34 and the connecting unit 26 as a whole from longitudinal displacement along the body 20.

To the end just stated, the body sections 20ª and 20ᵇ are provided with elongated, longitudinally-extending and aligned slots 38 and 39 which are disposed directly above and below the spring bar 25 and in alignment with the cap members 34 of the connecting unit 26. The sides of the slots 38 and 39 are provided with notches 40 arranged in opposed, aligned pairs, the pairs of notches being spaced apart to predetermined extents for a purpose which will become obvious hereinafter. The outer cylindrical portions of the cap members 34 are of such diameter that they project freely through the slots 38 and 39, and the lugs 37 on such cap members are so located and so positioned that they engage in the pairs of notches when aligned therewith, thereby holding the connecting unit 26 against longitudinal displacement along the slots 38, 39. It will be seen that with the arrangement above described, the position of the connecting unit 26 along the slots 38, 39 may be changed by pressing inwardly on the cap members 34 in opposition to the springs 35, and by sliding the unit 26 along the slots until the lugs 37 on the caps are aligned with the notches at the point where it is desired to locate the connecting unit. When this point is reached, the cap members 34 may be released, whereupon the springs 35 urge the cap members 34 outwardly, engaging their lugs 37 in the aligned pairs of notches 40. As the unit 26 is shifted longitudinally, it assumes various positions along the length of the spring bar 25, and, in this way, since the unit 26 is the sole connecting means between the spring bar 25 and the body 20, the effective or active length of the spring bar 25 is changed, thereby varying the power rating of the same and the wrench.

It will be appreciated that if the unit 26 is shifted to near the free end of the spring bar 25, a lesser pressure will be required to flex the spring and rock the parts relatively to a predetermined extent. As the unit 26 is shifted toward the forward end of the wrench, the pressure required to accomplish the predetermined flexing and rocking action is increased; wherefore, generally speaking, by shifting the unit 26 forwardly, the power rating of the wrench is increased, and vice versa, when it is shifted in the opposite direction. A scale 41 calibrated in terms of inch-pounds pressure, preferably, is provided on the upper body section 20ª along the slot 38, which scale has its pressure markings coinciding with the notches 40. The scale is so calibrated that the number of inch-pounds indicated at any particular point thereon is required to flex the spring bar 25 to that extent required to operate a signal means; and, for the reason above stated, the increases in pressure reading from the rear end of the slot 40 toward the forward end thereof.

In this form of wrench, I preferably employ a light signal which is arranged to first warn the operator when he is about to approach the predetermined pressure condition, and then to finally indicate when that condition has been reached. In carrying out this feature, I provide an electrical contact unit 50 (Figs. 1 and 3) which takes the form of an insulating block 51 secured by screws or other fastening devices 52 to the inner side wall of the body 20 adjacent the rear end of the work-engaging member arm 24. The insulating block 51 is provided with a pair of longitudinally-spaced openings 53 and 54 in which are mounted contact members 55 and 56, respectively. The inner ends of the openings 53, 54 are enlarged and threaded to detachably receive retaining nuts 57 and 58. The contact members 55 and 56 are T-shaped in longitudinal section and their head portions are received within the reduced-diameter parts of the openings 53, 54 with their stem portions approaching inwardly through suitable openings in the nuts 57, 58 toward the side of the work-engaging member arm 24. Springs 59 and 60 are mounted in the openings 53 and 54 behind the contact members 55 and 56, which springs constantly urge the contact members 55 and 56 inwardly and yieldably hold them in engagement with the retaining nuts 57 and 58. However, the springs are of such power that they will permit the contact members to yield inwardly when a predetermined pressure is applied to the inner ends thereof. Insulating washers 61 are disposed between the outward ends of the springs 59 and 60 and the body 20.

A contact unit 50ª similar to the unit just described is mounted on the opposite side of the body 20 so that the signaling functions hereinafter mentioned are carried out when the body 20 and the member 22 rock relatively in either direction, as when tightening or loosening the work. Both of the contact units 50, 50ª are so located that when the member 22 and its arm 24 rock in one direction or the other, the contact members corresponding to the contact members 55 and 56 will be engaged to complete an electrical circuit for lighting a lamp. The contact members 56 (one on each side of the wrench body) which are located nearest the rear end of the arm 24 are longer than the contact members 55 so that, upon relative rock movement of the parts, the contact member 56 will be first engaged to complete a circuit, as will be pointed out more particularly hereinafter, for lighting a warning lamp 62 and, as relative rock movement continues, with the contact member 56 engaged and the warning light on, the contact member 55 will eventually be picked up so that a circuit is completed through a stop lamp 63, indicating that no further pressure should be applied.

The warning and stop lamps 62 and 63 (Figs. 1 and 2) are suitably carried by sockets 64 mounted in the body 20 just rearwardly of the longitudinal slots 38 and 39 therein. The top or side walls, or both, of the body may be provided with openings similar to the openings 65 (Figs. 1 and 2) so that the light signal flashed when the lamps are on may readily be seen by the operator from various points. The electric current for lighting the lamps may be supplied by a battery 66 mounted in the end of the body 20 rearwardly of the lamps 62, 63, being grounded to the body 20 in a manner well understood and as indicated in the wiring diagram of Fig. 5. The battery 66 is connected through suitable wiring 67 with the lamps 62 and 63, and the lamp 62 is, in turn, connected by suitable wiring 68 with the contact member 56, while the lamp 63 is connected with the contact member 55 through suitable wiring 69. In this way, when the spring bar 25 flexes sufficiently to permit relative rock movement of the body 20 and member 22 to engage an arm 24 with the contact member 56, a circuit is completed from the battery 66, through the body 20, arm 24, contact member 56, wiring 68, lamp 62 and wiring 67 to light said lamp; and, when the rock movement is such as to engage the contact member 55, an additional circuit is completed through the body, the arm 24, contact member 55, wiring 69, lamp 63 and wiring 67 to light the lamp 63.

In the use of the foregoing structure, assuming that it is desired to tighten a piece of work to an extent requiring the application of 600 inch-pounds pressure, the spring-connecting unit 26 is adjusted to the position shown in Fig. 1. The wrench is then applied to the work and is moved in a clockwise direction as viewed in Fig. 1. As the work is tightened, and as the pressure limit is approached, the spring bar 25 flexes, permitting rock movement of the arm 24 and, just before the predetermined pressure application, the arm engages the contact member 56 and lights the lamp 62. The operator is thus warned so that he will proceed with caution in readiness to stop the application of pressure as soon as the rock movement has continued sufficiently to engage the contact member 55 and light the lamp 63. If, in the use of this wrench, it is desired to apply, for example, only 100 inch-pounds pressure to the work, the unit 26 is adjusted to engage the notches indicated by the number 100 scale marking on the wrench. When the parts are adjusted as just stated, the operation is the same as first given, except that lesser pressure is required to flash the signals at the predetermined pressure-application point.

The signal feature of my invention has utility in wrenches of the character hereinabove mentioned as requiring a master pressure device for variable power setting of the same. One such form of wrench is shown in Figs. 6 to 8, inclusive. This wrench includes a body 70 and a work-engaging member 71 having a rearwardly extending arm 72 similar to the arm 24 of the previously-described form. Relative rock movement between the body 70 and member 71 is yieldably opposed by a spring bar 73 which is similar to the spring bar 25 except that its effective or active length is not variable. The rear end of the body 70 is provided with a reduced and elongated handle 70ª through which pressure is applied through the wrench to the work.

The spring bar 73 is fixedly secured at its rear end in a block 74 which is, in turn, secured by suitable fastening devices 75 to the body 70. The forward end of the spring bar is received in a recess 76 in the rear end of the arm 72, rollers 77 being disposed in suitable recesses between the spring bar and the arm to facilitate rocking action between the arm and the spring bar. In this form, electric signal mechanism is actuated by the flexing movement of the spring bar to light first a warning lamp 78 and then a stop lamp 79 as in the previous form.

Specifically, the side wall of the body 70 includes a well 80 in the bottom of which are threaded openings receiving threaded cylinders 81, 82 formed of insulating material. The cylinders 81, 82 carry contact members 83 and 84 similar to the contact members 55 and 56, previously described, the inner ends of the cylinders 81, 82 being provided with openings through which the stem portions of the contact members pass. The heads of the contact members are slidably received within the cylinders 81 and 82 and are spring-pressed toward their innermost position in engagement with the bottoms of the cylinders by springs 85 and 86, which are retained in place in the cylinders by threaded plugs 87 and 88. The threaded support for the cylinders 81, 82 includes an inner block member 89 so shaped and threaded that it may be readily disposed between the cylinders as shown in Fig. 7. The block 89 is provided with an opening through which a screw 90 freely passes to engage a threaded opening in the bottom of the well 80. The block 89 is disposed in spaced relation to the bottom of the well so that when the cylinders 81, 82 are screwed inwardly to a predetermined position, the screw 90 may be tightened to clamp the block against the adjacent threaded portions of the cylinders so as to hold such cylinders fixedly in their adjusted condition.

The electric current for the signal mechanism is supplied by a battery 91 carried in the rear end of the handle 70ª, the several parts described being connected in an electrical circuit in substantially the same manner as described in connection with the first form.

In the use of this particular form of my invention, the wrench is first applied to a master pressure device (not shown) such, for example, as a master pressure indicating wrench, which will register the pressure applied through the handle 70ª. If the wrench is to be set to give a signal at, for example, the application of 600 inch-pounds pressure, the handle 70ª is actuated (while engaged with the master device), in the desired direction, to apply a pressure slightly less than that required pressure, at which time the contact cylinder 82 is set so that it is engaged with the spring bar, making contact to complete the electric circuit to light the warning lamp 78. Additional pressure is then applied to the wrench handle 70ª to indicate the required pressure on the master device, at which time the contact cylinder 81 is adjusted to make contact with the spring bar 73 to complete the electric circuit through the stop lamp 79. After this setting, the screw 90 is tightened to lock the parts in the adjusted position just stated. Further operation in the use of the wrench is the same as described in connection with the form of Fig. 1, except that spring bar 73 serves in part to complete the circuit for lighting the lamps. When it is desired to change the power rating of this wrench, it may again be adjusted in connection with a master device, as above stated, by properly setting the contact cylinders 81 and 82.

The well 80 is closed by a plate 92 which is swingably carried by the body at 93. The plate is provided with a latch element 94 which engages behind the screw member 95 carried by the body for releasably holding the plate in position over the well. In this way, accidental injury to and unauthorized tampering with the contact unit may be avoided.

If desired, an electrical gage device such as shown in Figs. 9 and 10 may be employed instead of the contact mechanism of the previously-described forms. Referring particularly to Figs. 9 and 10, the wrench in its entirety is not illustrated but it is to be understood that it includes a wrench body, a work-engaging member, and a work-engaging member arm similar to those of the previously-described structures. As shown in Fig. 10, this latter form includes a cup-shaped gage casing 100 which is adapted to be mounted upon the top of the wrench body in any desired manner. The casing 100 supports a dial 101 having a scale 102 thereon calibrated to indicate, preferably, inch-pounds pressure. The gage further includes a hand 103 rotatably supported by a shaft unit 104 which extends downwardly through the bottom of the casing 100 where it receives a pinion 105. The pinion 105 is engaged by a rack member 106 which may be carried by the work-engaging member at the point and in the manner indicated at 106 in Fig. 6. With such an arrangement, as the body and work-engaging member rock relatively, the rack 106 causes the pinion 105 to rotate, thereby rotating the hand 103 relative to the scale 102.

The electric feature of this form of wrench includes a ring member 107 rotatably mounted upon the gage casing 100. This ring is provided with an inner reduced flange 108 which is rotatably guided within the upper part of the gage casing 100, which flange is provided with a pair of vertically and circumferentially offset contact members 109 and 110. The contact members are of a type having spring contact parts adapted to flex, for a purpose which will become obvious hereinafter. The outer end of the gage hand 103 carries a contact pin 111 projecting both above and below such hand, the hand itself being so located relative to the contacts 109, 110 that it rotates in a plane passing between such contacts. With the arrangement just described, as the hand 103 rotates toward the contacts 109, 110, the upper end of its pin 111 first engages the contact 109 and, as rotation of the hand is continued, the lower end of its pin 111 will engage the contact 110. As these contacts are engaged in the manner stated, electric circuits are completed to light first a warning lamp 112 and next a stop lamp 113. Rotatable adjustment of the ring 107 moves the contact elements 109, 110 relative to the scale 102 so that the electric circuits may be caused to light the lamps at any predetermined pressure position by merely adjusting the ring 107 so that the hand 103 will engage the contacts at that desired point.

The electric circuit arrangement is diagrammatically illustrated in connection with Fig. 10. In this instance, a battery 114 may be employed, the same being supported by the handle portion of the wrench as in the previous forms. The battery 114 is grounded to the wrench body. Upon engagement of the warning contact 109, a circuit is completed through the battery 114, wiring 115, lamp 112, wiring 116, contact 109 and the body as indicated by the line 117 (Fig. 10) to light the lamp 112; and upon engagement of pin 111 with the stop contact 110, a circuit is completed through the battery 114, wiring 115, lamp 113, wiring 118, contact 110 and the body (see line 117) to light the lamp 113.

I believe that the operation and advantages of my invention will be well understood from the foregoing description. It is to be understood that, while I have shown several forms of my invention, other changes in details and arrangements of parts may be resorted to without departing from the spirit and scope of my invention as defined by the claims that follow.

I claim:

1. A torque indicating wrench comprising a member to which pressure is directly applied, another member adapted to be engaged with the work and rockably connected to said first member, a spring bar adapted to yieldably oppose relative rock movement between said members, electrical signal means operable upon a predetermined amount of relative rock movement of said members for signaling the application of a predetermined pressure to the work, and means engaging opposite sides of said spring bar and being adjustable relative to said spring bar to vary the force that must be applied to the wrench to effect actuation of said signal means.

2. A torque indicating wrench comprising a member to which pressure is directly applied, another member adapted to be engaged with the work and rockably connected to said first member, a normally straight spring bar radially aligned with said second mentioned member adapted to yieldably oppose relative rock movement between said members, electrical signal means operable upon a predetermined amount of relative rock movement of said members for signaling the application of a predetermined pressure to the work, and means for varying the effective moment arm of said spring bar for varying the pressure at which said signal means is operable.

3. A torque indicating wrench comprising a member adapted to be operably engaged with the work, another member rockably connected to said first member and through which pressure is directly applied to the wrench, a normally straight spring bar carried by one of said members in substantially radial alignment with the rock axis of said member which is adapted to engage the work, means connecting said spring bar to the other of said first-mentioned members in such a way that said spring bar yieldably opposes relative rock movement of said members, and signal means operable by and upon a predetermined amount of relative rock movement of said members for signaling the application of a predetermined pressure to the work.

4. A torque indicating wrench comprising a member adapted to be operably engaged with the work, another member rockably connected to said first member and through which pressure is directly applied to the wrench, a spring bar carried by one of said members, said spring bar being substantially radially aligned with the rock axis of the work engaging member, means connecting said spring bar to the other of said members in such a way that said spring bar yieldably opposes relative rock movement of said members, indicating means operable by and upon a predetermined amount of relative rock movement of said members for indicating the application of a predetermined pressure to the work, and means for varying the effective moment arm of said spring bar without varying the amount of rock movement required to operate said indicating means.

5. A torque indicating wrench comprising a member adapted to be operably engaged with the work, another member rockably connected with said first member, a spring bar adapted to yieldaybl oppose relative rock movement by said members, and electrically operated signal means including a signal device operable by and upon a predetermined amount of relative rock movement of said members for warning the operator that a desired predetermined pressure application is being closely approached, and a second signal device operable by and upon further relative rock movement of said members for signaling the operator that the predetermined pressure application has been attained and is being applied to the work, said warning signal being arranged to occur subsequent to the initial relative movement of said members and just prior to said second signal.

6. A torque indicating wrench comprising a member adapted to be operably engaged with the work, another member connected to and adapted to move relatively to said first member and through which pressure is directly applied, a spring bar adapted to yieldably oppose said relative movement, electrically operated signal means comprising a signal device operable upon a predetermined amount of relative movement of said members for warning the operator that a predetermined pressure is being approached, a second signal device operable upon further relative movement of said members for signaling the operator that the predetermined pressure has been attained, and means for varying the effective moment arm of said spring bar for varying the pressures at which said signal devices are operable.

7. A torque indicating wrench comprising a member adapted to be operably engaged with the work, another member movably connected to said first member, a spring bar adapted to oppose movement of said relatively movable members, electrical signal means for signaling the application of a predetermined pressure to the work comprising an electrical contact element associated with one of said relatively movable members and adapted to engage the other of said relatively movable members upon a predetermined relative movement thereof to complete an electrical circuit, electric current supply means, and an electric signal device in circuit with said current supply means, contact element and said other relatively movable member, and means connecting said spring bar to one of said members, said means being slidably mounted upon said spring bar for varying the force that must be applied to the wrench to operate said signal means.

8. A torque indicating wrench comprising a member adapted to be operably engaged with the work, another member connected to and adapted to move relatively to said first member, a spring member adapted to oppose movement of said relatively movable members, and electrical signal means comprising a pair of electrical contact elements associated with one of said relatively movable members and adapted to engage the other of said relatively movable members to complete electrical circuits, an electric current supply means, a pair of electric signal devices electrically connected to said current supply means, one of said signal devices being in circuit with one of said contact elements, current supply means and said other relatively movable member and the other of said signal devices being in circuit with the other of said contact elements, said current supply means and said other relatively movable member, and one of said contact elements being adapted to engage said other relatively movable member upon a predetermined amount of relative movement of said relatively movable members to operate one of said signal devices to warn the operator that a desired predetermined pressure is being approached and the other of said contact elements being adapted to engage said other relatively movable member upon further relative movement of said relatively movable members to operate said other signal device to signal the operator that the desired predetermined pressure has been attained, said warning signal being arranged to occur subsequent to the initial relative movement of said members and just prior to said other signal.

9. A torque indicating wrench comprising a member through which pressure is directly applied to the work, a second member movably supported by said first member and adapted for engagement with the work, an elongated spring bar between said members yieldably opposing relative movement thereof, and means slidably mounted upon said spring bar for varying the active length of said spring bar for varying the pressure at which said spring bar will flex and permit relative movement of said members.

10. A torque indicating wrench comprising a member through which pressure is directly applied to the work, a second member movably supported by said first member and adapted for engagement with the work, an elongated spring bar between said members yieldably opposing relative movement thereof, means for varying the active length of said spring bar for varying the pressure at which said spring bar will flex and permit relative movement of said members, said means being slidably mounted upon said spring bar, and signal means operable by relative movement of said members for giving a signal indicating that the intended pressure is being applied to the work.

11. A torque indicating wrench comprising a work-engaging member, a body member upon which said work-engaging member is rockably mounted, a spring bar operably connected at one end to one of said rockable members, means for connecting said spring bar to the other of said rock members, to prevent relative lateral movement therebetween in opposite directions and adapted to be adjusted longitudinally along said spring member to vary the effective moment arm of said spring member, and means operable upon a predetermined amount of relative rock movement of said arm members for signaling the application of a predetermined pressure to the work.

12. A torque indicating wrench comprising a work-engaging member, another member rockably supporting said work-engaging member and through which pressure is directly applied to the work, a spring bar operably connected at one end to one of said rockable members and adapted to yieldably oppose said rock movement, means connecting said spring bar to said other member to prevent relative lateral movement therebetween in opposite directions and adapted to be adjusted longitudinally along said spring member to vary the effective moment arm of the latter, and electrical signal means including an electric contact element actuated by and upon a predetermined amount of relative rock movement of said rock members, a signal device, and current supply means, for signaling the application of a predetermined pressure to the work.

13. A torque indicating wrench comprising a work-engaging member, another member rockably supporting said work-engaging member, a spring bar between said members, said spring bar being substantially radially aligned with the rock axis of said work engaging member, means operably connecting said spring bar to both of said rockable members for yieldably opposing relative rock movement thereof, and electrical signal means for signaling the application of a predetermined pressure to the work including an electrical contact element associated with one of said rock members and adapted to engage one of the other of said members upon relative movement of said rock members to complete an electrical circuit, electric current supply means and an electric signal device in circuit with said current supply means and contact element, said contact element being adjustable toward and from the member which engages it for varying the pressure at which the signal is given.

14. A torque indicating wrench comprising a work-engaging member, another member rockably connected to said work-engaging member and through which pressure is directly applied, a spring bar operably connected to both of said members and adapted to yieldably oppose rock movement of said rock members, said spring bar being substantially radially aligned with the rock axis of said work engaging member, electrical signal means comprising a pair of electrical contact elements associated with one of said rock members and adapted to engage one of the other of said members in succession upon different extents of rock movement of said rockable members to successively complete electrical circuits, an electric current supply means, a pair of electric signal devices electrically connected to said current supply means, one of said signal devices being in circuit with one of said contact elements and said current supply means, and the other of said signal devices being in circuit with the other of said contact elements and said current supply means, both said contact elements being adjustable toward and from their engaging member for varying the pressure at which said signal devices are operated.

15. A torque indicating wrench comprising, a handle member adapted to be gripped by an operator for applying a turning force to a work piece; a work-engaging member for engaging a work piece; a normally straight spring bar operatively positioned between said work-engaging member and said handle member and arranged to be flexed by force applied thereto through said handle member, said spring bar being arranged substantially radially with respect to said work engaging member; electrical signal means; an electrical contact element associated with said handle member and arranged in circuit with said signal means; and means associated with said work-engaging member arranged to engage said electrical contact element when said spring bar has been flexed a predetermined amount, whereby to complete a circuit for operating said signal means.

16. A torque indicating wrench comprising, a handle member adapted to be gripped by an operator for applying a turning force to a work piece; a work-engaging member for engaging a work piece; a normally straight spring bar operatively positioned between sai dwork-engaging member and said handle member and having one end portion thereof operatively connected with said work-engaging member, said spring bar being arranged to be flexed by force applied thereto through said handle member and being arranged substantially radially with respect to said work engaging member; electrical signal means including a battery, a signal lamp and an electrical contact element operatively carried by said handle member; and means associated with said work-engaging member arranged to engage said electrical contact element when said spring bar has been flexed a predetermined amount, whereby to complete a circuit for operating said signal lamp.

17. A torque indicating wrench comprising, a handle member adapted to be gripped by an operator for applying a turning force to a work piece; a work-engaging member for engaging a work piece, said work-engaging member having a force transmitting arm connected therewith; a normally straight spring bar extending lengthwise from said arm positioned between said arm and said handle member and having one end thereof operatively associated with said arm and its opposite end operatively associated with said handle member, said spring bar being arranged to transmit force to said arm and to be flexed by force applied thereto through said handle member; electrical signal means; an element constituting an electrical contact carried by one of said members, said element being adjustable relatively to the other of said members and being arranged to be engaged to complete a circuit for operating said electrical signal means when said spring bar has been flexed a predetermined amount.

18. A torque indicating wrench comprising, a handle member adapted to be gripped by an operator for applying a turning force to a work piece; an arm member; a work-engaging member for engaging a work piece rotatably carried by one of said members; a spring bar extending substantially radially relatively to the axis of rotation of said work-engaging member, said spring bar having one end thereof connected to said arm and being arranged to be flexed by force applied thereto through said handle member; and signal means arranged to operate upon flexing of said spring bar to a given extent.

19. A torque indicating wrench comprising, a handle member adapted to be gripped by an operator for applying a turning force to a work piece; an arm member; a work-engaging member for engaging a work piece rotatably carried by one of said members; a spring bar extending radially relatively to the axis of rotation of said work-engaging member, said spring bar having one end thereof connected to said arm and being arranged to be flexed by force applied thereto through said handle member; signal means arranged to operate upon flexing of said spring bar to a given extent; and adjustable means for varying the extent of flexing of said spring bar required to operate said signal means.

20. A torque measuring wrench comprising a handle member adapted to be gripped by the operator for applying a turning force to a piece of work, a work-engaging member having a part thereon extending lengthwise of the wrench, a flexible spring bar disposed between said members and through which the turning force is applied to the work-engaging member from said handle member, and electric signal means for indicating the turning force applied which includes electric current supply means and an electric contact element and a signal device in circuit with each other and carried by said handle member, said part on the work-engaging member extending alongside said contact element in normally spaced relation thereto and adapted to engage said contact element and complete the electric circuit through said current supply means and said signal device when said spring bar is flexed a predetermined amount.

21. A torque indicating wrench comprising a handle member, a work-engaging member, a normally straight flexible spring bar between said members arranged to transmit turning force applied to said handle member to said work-engaging member, said spring bar being arranged substantially radially to the axis of rotation of said work-engaging member, a signal device including a signal means, a current source, and electrical contact means, said contact means being arranged to be actuated upon a predetermined relative movement of said handle and work-engaging members to operate said signal means, and means adjustable relative to said spring bar for varying the force that must be applied to said handle member to produce said predetermined relative movement necessary to operate said signal means.

22. A torque wrench comprising a handle member, a work-engaging member, a normally straight flexible spring bar between said members arranged to transmit turning force applied to said handle member to said work-engaging member, means mounted in said handle member and shiftable along said spring bar to vary the effective moment arm of said spring bar, and signal means arranged to be actuated upon a predetermined relative movement of said handle member with respect to said work-engaging member.

23. A torque wrench comprising a handle member, a work-engaging member, a normally straight flexible spring bar between said members arranged to transmit turning force applied to said handle member to said work-engaging member, an elongated slot formed in said handle member, means adjustable in said slot and along said spring bar for varying the effective moment arm of said spring bar, and signal means arranged to be actuated upon a predetermined reltive longitudinal movement of said handle member with respect to said work-engaging member.

24. A torque wrench comprising a handle member, a work-engaging member, a normally straight flexible spring bar between said members arranged to transmit turning force applied to said handle member to said work-engaging member, means adjustably mounted with respect to said handle member and movable longitudinally of said spring bar for varying the effective moment arm of said spring bar, said means including pivot means arranged to allow slight relative movement of said spring bar with respect to said adjustment means when said adjustment means is in a given fixed position relative to said handle member, and signal means arranged to be actuated upon a predetermined movement of said handle member with respect to said work-engaging member.

25. A torque wrench comprising a handle member, a work-engaging member, a normally straight flexible spring bar between said members arranged to transmit turning force applied to said handle member to said work-engaging member, said handle member having an elongated slot with notches formed in at least one side wall thereof, adjustable fulcrum means for said spring bar movable longitudinally of said spring bar for varying the effective moment arm of said spring bar, said adjustable fulcrum means including a member having a lug cooperable with the notches in said handle member for maintaining said fulcrum in a desired given position relative to said handle member, and signal means arranged to be actuated upon a predetermined movement of said handle member with respect to said work-engaging member.

26. A torque indicating wrench comprising a member to which pressure is directly applied by the operator, a second member movably connected to said first member and adapted for engagement with the work, said second member having a rearwardly projecting arm, spring means between said members yieldably opposing relative movement thereof, said spring means being radially aligned with said arm, and signal means operable by and upon a predtermined relative movement of said members for first warning the operator that a desired predetermined final pressure is being closely approached and which upon further relative movement of said members is adapted to give a signal indicating that said final predetermined pressure is being applied to the work, said warning signal being arranged to occur subsequent to the initial relative movement of said members and just prior to said final signal.

27. A torque indicating wrench comprising a member to which pressure is directly applied by the operator, a second member movably connected to said first member and adapted for engagement with said work, said second member having a rearwardly projecting arm, a spring bar between said members yieldably opposing relative movement thereof, said spring bar being radially aligned with said arm, signal means operated by and upon a predetermined relative movement of said members for first warning the operator that a desired predetermined final pressure is being closely approached and which upon further relative movement of said members is adapted to give a signal indicating that said final pressure is being applied to the work, and means adjustable relative to said spring bar for varying the effective moment arm of said spring bar to vary the pressure at which said warning and final signals are given.

28. A torque indicating wrench comprising a member to which pressure is directly applied by the operator, a second member movably connected to said first member and adapted for engagement with the work, a spring bar between said members arranged to yieldably oppose relative movement thereof, and signal means operable by and upon relative movement of said members, said signal means including a first element carried by one of said members and arranged to be engaged by another of said members upon a predetermined relative movement of said members to produce a warning signal to indicate to the operator that a desired predetermined final pressure is being closely approached, said signal means also including a second element carried by one of said members and arranged to be engaged by another of said members upon further predetermined relative movement of said members to produce a final signal to indicate to said operator that said desired pressure is being applied to the work.

HERMAN W. ZIMMERMAN.